US008392840B2

(12) United States Patent
Sharma et al.

(10) Patent No.: US 8,392,840 B2
(45) Date of Patent: Mar. 5, 2013

(54) LARGE SETS OF DATA

(75) Inventors: Sean K Sharma, San Jose, CA (US); Nicolae Surpatanu, San Jose, CA (US); Bradley R. Pettit, Los Gatos, CA (US); Junmin Hao, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 354 days.

(21) Appl. No.: 12/471,026

(22) Filed: May 22, 2009

(65) Prior Publication Data

US 2010/0299620 A1 Nov. 25, 2010

(51) Int. Cl.
*G06F 3/00* (2006.01)

(52) U.S. Cl. ......... 715/760; 715/771; 715/205; 715/788

(58) Field of Classification Search .................. 715/760
See application file for complete search history.

(56) References Cited

U.S. PATENT DOCUMENTS

| | | | | |
|---|---|---|---|---|
| 5,999,978 | A | 12/1999 | Angal et al. | |
| 6,226,692 | B1 | 5/2001 | Miloushev | |
| 6,438,618 | B1 | 8/2002 | Lortz | |
| 6,446,136 | B1 | 9/2002 | Pohlmann et al. | |
| 6,505,241 | B2 | 1/2003 | Pitts | |
| 6,574,630 | B1 | 6/2003 | Augustine et al. | |
| 6,651,217 | B1 | 11/2003 | Kennedy et al. | |
| 6,704,804 | B1 | 3/2004 | Wilson | |
| 6,751,665 | B2 | 6/2004 | Philbrick et al. | |
| 6,832,355 | B1 * | 12/2004 | Duperrouzel et al. | 715/788 |
| 7,216,292 | B1 | 5/2007 | Snapper et al. | |
| 7,398,473 | B2 | 7/2008 | Stoner et al. | |
| 7,424,717 | B2 | 9/2008 | Blevins | |
| 7,437,376 | B2 | 10/2008 | Sikchi | |
| 7,441,253 | B2 | 10/2008 | Atkinson | |
| 7,460,443 | B2 | 12/2008 | Elners | |
| 7,475,384 | B2 | 1/2009 | Heath | |
| 7,483,870 | B1 | 1/2009 | Mathew | |
| 7,899,370 | B2 | 3/2011 | Nakajima | |
| 8,131,676 | B2 | 3/2012 | Pettit | |
| 8,132,181 | B2 | 3/2012 | Lenharth et al. | |
| 2002/0118300 | A1 | 8/2002 | Middleton | |
| 2002/0156556 | A1 | 10/2002 | Ruffner | |
| 2002/0156840 | A1 | 10/2002 | Ulrich et al. | |
| 2004/0057348 | A1 | 3/2004 | Shteyn | |
| 2004/0218894 | A1 | 11/2004 | Harville et al. | |
| 2005/0038791 | A1 * | 2/2005 | Ven | 707/100 |
| 2005/0114757 | A1 | 5/2005 | Sahota et al. | |
| 2005/0172309 | A1 * | 8/2005 | Risan et al. | 725/1 |
| 2005/0188350 | A1 | 8/2005 | Bent et al. | |
| 2005/0278737 | A1 | 12/2005 | Ma et al. | |

(Continued)

FOREIGN PATENT DOCUMENTS

| | | | |
|---|---|---|---|
| WO | WO-2004027606 | | 4/2004 |
| WO | 2005093603 | A1 | 10/2005 |

OTHER PUBLICATIONS

Paging in ASP.NET by Andrew Merlino, published on Sep. 10, 2003, 4 pages.*

(Continued)

*Primary Examiner* — William Bashore
*Assistant Examiner* — Reza Nabi
(74) *Attorney, Agent, or Firm* — Wolfe-SBMC

(57) ABSTRACT

This document describes tools that enable a computing device to retrieve large data in smaller blocks. The tools also allow the computing device to receive and display data that does not include display formatting information through the use of templates.

16 Claims, 4 Drawing Sheets

U.S. PATENT DOCUMENTS

| | | | | |
|---|---|---|---|---|
| 2006/0021057 | A1 | 1/2006 | Risan et al. | |
| 2006/0070083 | A1 | 3/2006 | Brunswig | |
| 2006/0074981 | A1 | 4/2006 | Mauceri | |
| 2006/0143236 | A1 | 6/2006 | Wu | |
| 2006/0196950 | A1* | 9/2006 | Kiliccote | 235/494 |
| 2006/0248451 | A1 | 11/2006 | Szyperski | |
| 2006/0270462 | A1* | 11/2006 | Chi | 455/566 |
| 2007/0124460 | A1 | 5/2007 | McMullen | |
| 2007/0139441 | A1 | 6/2007 | Lucas | |
| 2007/0226353 | A1 | 9/2007 | Ruul | |
| 2008/0033806 | A1 | 2/2008 | Howe | |
| 2008/0064351 | A1 | 3/2008 | Landschaft | |
| 2008/0114810 | A1 | 5/2008 | Malek | |
| 2008/0134250 | A1 | 6/2008 | Liu et al. | |
| 2008/0205205 | A1 | 8/2008 | Chiang | |
| 2008/0215345 | A1 | 9/2008 | Hollingsworth et al. | |
| 2008/0282083 | A1 | 11/2008 | Risan et al. | |
| 2008/0301803 | A1 | 12/2008 | Ontaneda et al. | |
| 2008/0313650 | A1 | 12/2008 | Arnquist et al. | |
| 2008/0319856 | A1 | 12/2008 | Zito | |
| 2009/0077211 | A1* | 3/2009 | Appleton et al. | 709/223 |
| 2009/0138502 | A1 | 5/2009 | Kalaboukis et al. | |
| 2009/0198744 | A1 | 8/2009 | Nakamura | |
| 2009/0204719 | A1* | 8/2009 | Simongini et al. | 709/231 |
| 2009/0217146 | A1* | 8/2009 | Goldfarb | 715/205 |
| 2009/0307212 | A1* | 12/2009 | Ramot et al. | 707/5 |
| 2010/0095337 | A1* | 4/2010 | Dua | 725/110 |
| 2010/0165877 | A1 | 7/2010 | Shukla et al. | |
| 2010/0241527 | A1 | 9/2010 | McKenna et al. | |
| 2010/0241669 | A1 | 9/2010 | Pettit | |
| 2010/0257216 | A1 | 10/2010 | Pettit | |
| 2010/0257540 | A1* | 10/2010 | Schuler et al. | 719/313 |
| 2011/0099500 | A1* | 4/2011 | Smith et al. | 715/771 |

OTHER PUBLICATIONS

ASP.NET Ajax auto-complete control by Matt Berseth, published on Jan. 10, 2008, 5 pages.*

Load Content while scrolling posting at WebResourceDepot, published on Jun. 3, 2008, 3 pages.*

"DMP-6000 Network High Definition Digital Signage Media Player & Content Distribution Server (CDS) Software platform", Retrieved at <<http://www.gctglobal.com/Products/Set_Top_Box/set_top_box.html>>, Jan. 29, 2009, pp. 1-3.

"Set-Top Box Design Template", Retrieved at <<http://msdn.microsoft.com/en-us/library/ms924238.aspx>>, Jan. 29, 2009, pp. 1-4.

"SeaChange IPTV", Retrieved at <<http://www.schange.com/en-US/Docs/Public/products/IPTV_TVNav_BR_7-11-2008.pdf>>, Jul. 11, 2008, pp. 1-16.

"Data Binding Between Controls in Windows Forms", Retrieved from <http://msdn.microsoft.com/en-us/magazine/cc301575.aspx>, (2009),10.

"How to: Ensure Multiple Controls Bound to the Same Data Source Remain Synchronized", Retrieved from <http://msdn.microsoft.com/en-us/library/ms404299.aspx>, (2009),4.

"Manipulating Data through a Binding Source", Retrieved from <http://my.safaribooksonline.com/032126892X/ch04lev1sec5>, (2009),2.

"Palm Prē", Retrieved from <<http://www.palm.com/us/products/phones/pre/>>on Apr. 24, 2009, Scroll down to Connected Calendars and Contacts and click on "See Gallery"—Images 6, 7 and 8, entitled "Contacts," "Linked Contact" and "Linked Contact",(Apr. 24, 2009),1-7.

"Orban/Coding Technologies AAC/aacPlus Player Plugin™", Retrieved at <http://www.orban.com/plugin/Read_Me.html>, (Apr. 2008),14.

"Best Practices for NI TestStand User Interface Development", Retrieved from: http://zone.ni.com/devzone/cda/tut/p/id/7560 on Feb. 4, 2009., (Jul. 15, 2008), 10 Pages.

Clausen, Joern "Attaching Data to Timeline Event", Retrieved from: http://www.mail-archive.com/general@simile.mit.edu/msg00966.html on Feb. 4, 2009., (Mar. 10, 2007),2 Pages.

Hallberg, Aaron "Attaching Custom Data to a Build", Retrieved from: http://blogs.msdn.com/aaronhallberg/archive/2008/05/27/attaching-custom-data-to-a-build.aspx on Feb. 4, 2009., (May 27, 2008),3 Pages.

"Custom Event Classes", Retrieved from: http://wiki.wxpython.org/CustomEventClasses on Feb. 4, 2009., (Mar. 11, 2008), 1 Page.

"Non-Final Office Action", U.S. Appl. No. 12/406,816, (Jun. 27, 2011),14 pages.

"Non-Final Office Action", U.S. Appl. No. 12/418,224, (Jun. 9, 2011),11 pages.

Barton, John et al., "Sensor-Enhanced Mobile Web Clients: an XForms Approach", In Proceedings of WWW 2003,(May 2003),pp. 80-89.

"Non-Final Office Action", U.S. Appl. No. 12/418,317, (Mar. 15, 2012), 10 pages.

"Final Office Action", U.S. Appl. No. 12/406,816, (Jan. 20, 2012),16 pages.

"Notice of Allowance", U.S. Appl. No. 12/418,224, (Nov. 28, 2011),8 pages.

Faltstrom, P. "E.164 Number and DNS", *Network Working Group*, Retrieved from: <http://www.ietf.org/rfc/rfc2916.txt> on Jan. 4, 2012,(Sep. 2000),7 pages.

"Final Office Action", U.S. Appl. No. 12/418,317, (Sep. 20, 2012), 9 pages.

* cited by examiner

LARGE SETS OF DATA

BACKGROUND

Conventional approaches to using and retrieving large sets of data are often problematic. Computing devices with limited memory, for example, cannot store all of a large set of data at once. Current approaches break the data into separate chunks but, in so doing, cause these computing devices to perform poorly when they retrieve new chunks of data.

Another issue with large sets of data involves distributing data intended for display. Current approaches for distributing sets of data distribute data and formatting information together, which increases the amount of information distributed. Further, these approaches, whether for large or small sets of data, also require a source of the data to know of the computing device's display capabilities and process the data into a displayable format prior to distributing the data to the computing device.

Some other approaches for displaying sets of data require the computing device to include custom script to download the data and format it into a displayable format. This custom script may require modification and maintenance and be cumbersome when the provider of the data is not the same entity as the administrator of the computing device.

SUMMARY

This document describes tools that enable a computing device to use and retrieve large sets of data. The tools also or instead allow a computing device to receive and display data that is not combined with the data's display formatting information.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes tools that enable a computing device to use and retrieve large sets of data. In one embodiment, a large set of data is retrieved in a series of blocks. When a computing device uses a block of data and, while moving through data elements of the block, reaches a defined retrieval threshold, the next block in the series is retrieved prior to the computing device needing that next block. By so doing the computing device is able to more-smoothly transition between using each of the blocks.

This document also describes tools that allow a computing device to receive and display data that is not combined with the data's display formatting information. This saves memory and communication bandwidth on both the computing device and the source of the data. In one embodiment, a computing device receives markup data with one or more templates from a source of markup data. The computing device then retrieves data (which lacks display formatting information), picks a template to use, and populates the template with the data. This populated template may then be displayed to a user.

Example Environment

Figure 1:
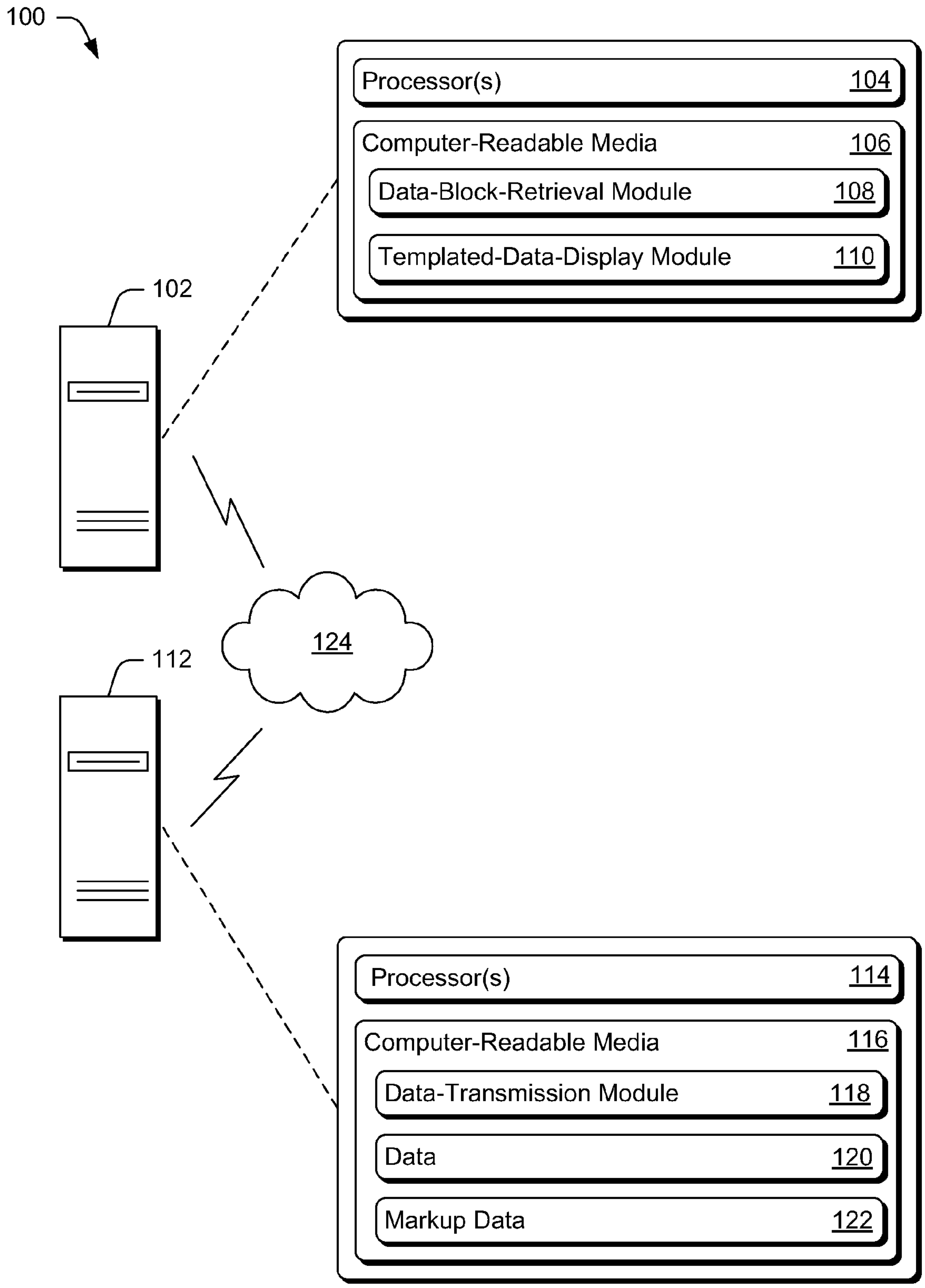
FIG. 1 is an illustration of an environment in which data may be received separately from markup for displaying the data and the data may be received in separate smaller blocks of data.

FIG. 1 is an illustration of an environment 100 in an example embodiment in which the tools may operate to divide large sets of data into smaller blocks of data and to separate the display formatting of the data from the data itself in part so that the data is smaller. Environment 100 includes a computing device 102, some examples of which include a set-top box, a personal computer, a media player, or a smart phone to name a few. Computing device 102 includes one or more processors 104 and computer-readable media 106. Computer-readable media 106 contains or has access to a data-block-retrieval module 108 and a templated-data-display module 110.

In some embodiments computing device 102 is configured to communicate with computing device 112, some examples of which include a server computer, a satellite uplink computer, or a personal media server to name a few. Computing device 112 includes one or more processors 114 and computer-readable media 116. Computer-readable media 116 contains or has access to a data-transmission module 118, data 120, and markup data 122. These devices may communicate through a communication network 124. Communication network 124 may include the Internet, a local-area network, a wide-area network, a wireless network, and/or a USB hub.

Data-block-retrieval module 108 is capable of retrieving data 120 from data-transmission module 118 in blocks. These blocks of data are smaller than data 120 as a whole. This allows computing device 102 to use data 120 without requiring memory with a capacity to store data 120 in its entirety. Data-block-retrieval module 108 retrieves the data blocks in a manner permitting a smooth transition between use of blocks. One such example of a smooth transition is displaying a block of data, retrieving the next block of data, and displaying that next block of data all without the display having a noticeable pause between the first and next block.

This retrieval is configurable in that an initial start index, pre-retrieve amount, and pre-retrieve threshold are configurable. The initial start index, often set to 0 for the first item in data 120, specifies the index of the first item to retrieve. The pre-retrieve amount specifies the number of items to retrieve in a single block. The pre-retrieve threshold specifies the number of items remaining to the end of retrieved items before the next block of data is retrieved (though it may also set the number moved through as well). For example, assume that the initial start index is set to 0, the pre-retrieve amount is set to 4, and the pre-retrieve threshold is set to 2. Items 0-3 of data 120 will be retrieved and be used to populate a control. When scrolling through the control's items, the next block, items 4-7, will be retrieved when the item in focus has come to within 2 items of the end of the retrieved items (the item at index 2).

Templated-data-display module 110 is capable of retrieving markup data 122 from computing device 112. Markup data 122 includes the definition for one or more controls, each of which includes one or more item templates. A control's definition may also contain values for the initial start index, pre-retrieve amount, and pre-retrieve threshold described above.

By way of example, consider a case where markup data defines a web application that can use data 120. Templated-data-display module 110 receives data 120 (without display formatting information) on its own or through data-block-retrieval module 108. Module 110 applies data 120 to the templates within markup data 122 to create one or more items to populate the control. Module 110 then displays the control and its items.

Note that one or more of the entities shown in FIG. 1 may be further divided, combined, and so on. Thus, the environment 100 of FIG. 1 illustrates some of many possible environments capable of employing the described techniques. For example, computing device 112 may have data 120 and markup data 122 combined so that the display formatting information is included with the data and computing device 102 may only have data-block-retrieval module 108. Or computing device 102 may only have templated-data-display module 110, which directly receives data 120 in one whole transmission instead of breaking it into blocks. In another example, computing devices 102 and 112 may be the same computing device and communication network 124 may not be present, in which case data 120 and markup data 122 are local sources of data such as an extensible markup language (XML) file or a database.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, the tools or a module may represent program code that performs specified tasks when executed on a processor (e.g., CPU or CPUs). The program code can be stored in one or more computer-readable memory devices, such as computer-readable media 106 and 116. The features and techniques of the tools are platform-independent, meaning that they may be implemented on a variety of commercial computing platforms having a variety of processors.

Example Process for Receiving and Displaying Blocks of Data Using Templates

The following discussion describes ways in which the tools may operate to enable a computing device to separate display formatting from data using templates as well as break large sets of data into smaller blocks of data. Aspects of this process may be implemented in hardware, firmware, software, or a combination thereof. This process is shown as sets of blocks that specify operations performed by the tools, such as through one or more modules or devices, and are not necessarily limited to the order shown for performing the operations by the respective blocks. In portions of the following discussion reference may be made to environment 100 of FIG. 1 as well as to FIG. 3.

Figure 2:
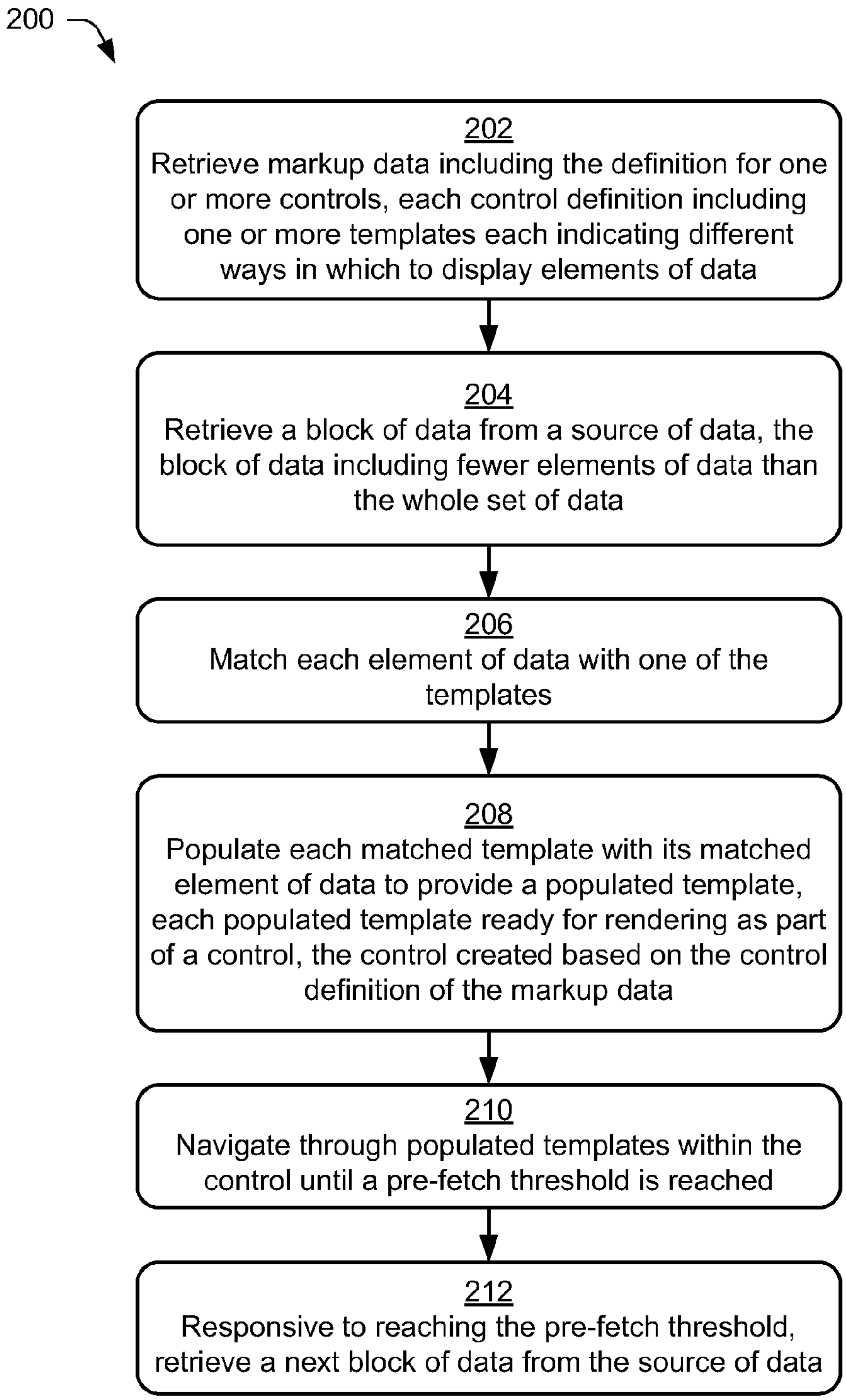
FIG. 2 is a flow diagram depicting an example process, including receiving and displaying blocks of data using templates.

FIG. 2 is a flow diagram depicting an example process 200 for retrieving and displaying blocks of data using templates. An example user interface and system layout is described as part of this example process, though other user interfaces and system layouts are also contemplated.

Block 202 retrieves markup data that includes definitions for controls, each control definition including templates, each of which indicates different ways in which to display elements of data. The source of this markup data may be a remote computing device, a local file or database, or a file or database located on removable storage media to name a few.

Two examples of controls that may be defined are a list control and a menu control. Each control definition includes one or more item templates. Essentially, the markup data is without actual data but includes information to format and display individual elements of data.

In one embodiment, an element of data includes one full entry of data. For example, a television program element may include the program's name, the program's air time, the program's length, a description of the program, or other pertinent information about the program. All of this information is included in one element of data. The element may be in the form of an Extensible Markup Language (XML) element named "program" that includes elements pertaining to the information above. In another embodiment, an element of data may include a single data value such as an integer, a string, or a character to name a few. The markup data may also include events and define the actions of those events. After retrieving the markup data, the markup may be parsed and the controls may be rendered without elements of data in them.

Figure 3:
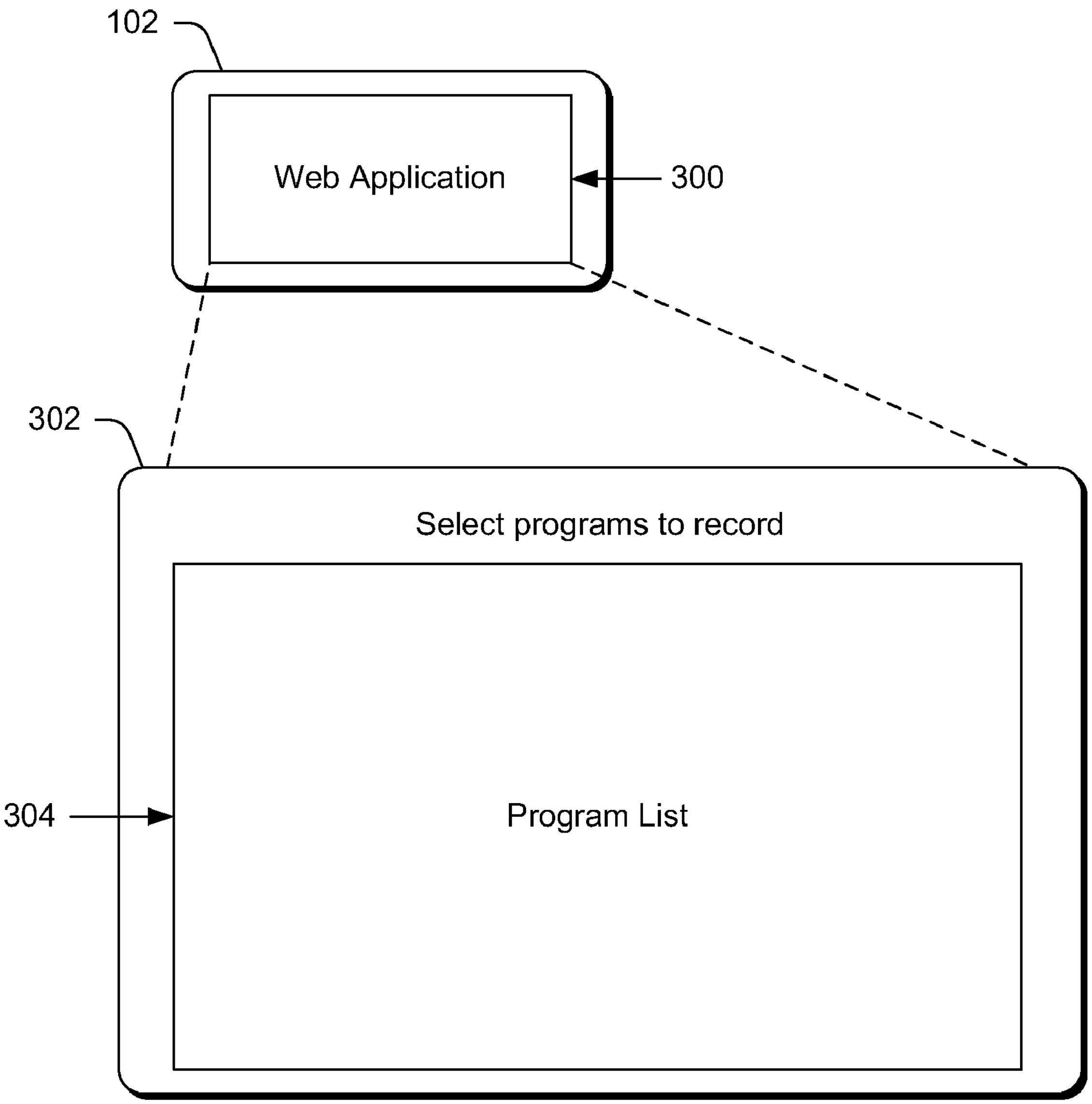
FIG. 3 is an illustration of an example computing device and components relating to the process of FIG. 2.

By way of example, consider FIG. 3. FIG. 3 depicts an embodiment for performing process 200 of FIG. 2. Computing device 102 previously received markup data 122 using template-data-display module 110. Module 110 rendered markup data 122 as web application 300, which contains a user interface 302. User interface 302 has a list control 304 that shows a list of programs available to record. In block 202, module 110 retrieves markup data 122 from computing device 112. Markup data 122 includes a definition for a list control, which module 110 renders on user interface 302 as program list 304. Markup data 122 includes one or more templates to be populated with elements of data to create items (populated templates) to be added to program list 304. Markup data 122 does not include the actual data elements about the television programs. In other words, markup data 122 does not include the data elements but rather includes information used to format and display those data elements.

Returning to FIG. 2, block 204 retrieves a block of data from a source of data, the block of data including fewer elements of data than a whole set of data from which the block is retrieved. The source of data may be a remote computing device, a local file or database, or a file or database located on removable storage media to name a few.

In one embodiment, a Universal Resource Identifier (URI) to the source of the data is included in the markup data received in block 204. An example URI is:

http://server/programs.aspx?startIndex=$(startIndex)& itemCount=$(itemCount)

Both $(startIndex) and $(itemCount) are variables that are replaced prior to submitting an http request with the URI. The startIndex specifies the index of the first element within the data that is desired to be received. The itemCount specifies the number of elements within the data that are desired to be received. For example, a startIndex of 0 and an itemCount of 8 would request elements 0-7 of the data from the source of the data. The initial value of startIndex can be specified within the markup data inside the definition of a control. The value of itemCount can be specified within the control's definition.

Continuing the ongoing example, the definition for program list 304 includes an initial start index of 0 and a pre-retrieve amount of 6. In block 204, data-block-retrieval module 108 substitutes $(startIndex) with 0 and $(itemCount) with 6 and submits the http request to data-transmission module 118 on computing device 112. Data-block-retrieval module 108 then receives elements 0-5 of data 120 from data-transmission module 118.

Block 206 matches each element of data with one of the templates. One template may be used with one element within the data block and a different template used with another element within the data block. Block 208 populates each matched template with its matched element of data to provide a populated template, which can then be added as an item to a control and rendered on the display.

Continuing the ongoing example, module 108 communicates data elements 0-5 to module 110, which matches each element with a template from markup data 122. A template name or other identifier is specified within each data element, which is then compared with identifiers of the templates provided in markup data 122. In some other embodiments, however, a default template is used or a template is used that corresponds to the type of data elements expected to be received. Module 110 then populates each matched template with data from its matched element to create items (populated templates) for program list control 304.

An element can be matched to a template and that template populated with the element's data before matching the next element or some or all elements can be matched prior to populating the templates. Module 110 adds each item to program list control 304 after which they are displayed to the user.

Block 210 navigates through the items (populated templates) within the control until a pre-retrieve threshold is reached. Examples of navigating include those caused by a user scrolling through a list or menu control or by an automated control that is using the data. Responsive to reaching the pre-retrieve threshold in the data, block 212 retrieves a next block of data from the source of the data.

Continuing the ongoing example, assume a user selects up and down arrows on a remote control to move through the items in list control 304. As the user moves through the list, the current item gains focus. When that focus is within a pre-retrieve threshold from the end (or beginning) of currently-received items, module 108 retrieves the next block. This pre-retrieve threshold is defined within the control's definition in markup data 122.

A pre-retrieve threshold of 4 will cause the next block of data to be requested when focus is on an item that is 4 or less away from items that have not yet been received. In the ongoing example, items 0-5 are received so the next block will be downloaded when the user reaches item 2 in program list 304. At that time, module 108 substitutes $(startIndex) with 6 and $(itemCount) with 6 to request elements 6-11 of data 120 from module 118.

Once a user scrolls far enough in program list 304, computing device 102 and/or module 108 may delete earlier items in the list to save memory. If the user scrolls back towards these items, they may be requested again once the pre-retrieve threshold is reached. In some cases the initial start index is set to some number in the middle of data 120 and the user may begin by scrolling backwards. The tools may handle scrolling in both directions so that the user does not have to wait for more items to be received.

In more detail, the markup data may include event and/or action definitions. In the example below, markup data contains an item template for pictures to view. Inside this template is a definition of an event that is triggered when a remote control's arrow button is pressed and a new item is focused, which results in the previously focused item getting a blur event. For example note: <Event type="onfocus" action="showSelected"/>. Also included in this template is a definition for the action "showSelected." Within this template, "PICTURE" is the name/id of an Image object.

```
<Template name="Picture" >
    <Text DataPath="pictureTitle"/>
    <Image id="PICTURE" DataPath="pictureUrl" />
    <Event type="onfocus" action="showSelected" /> <!-perform
showSelected when item has focus -->
    <Event type="onblur" action="showUnselected" /> <!-perform
showUnselected when item has focus -->
    <Action name="showSelected" type="show" target="PICTURE" />
<!- show the picture -->
    <Action name="showUnselected" type="hide" target="PICTURE" />
<!- hide the picture -->
    <Event type="onclick" action="openPicture" />
</Template>
```

To differentiate the generated item from the item template itself, the item template assigns unique ids for each id defined in the item template. References within the generated item and ids of components contained within the generated item are replaced with a new id unique to the generated item.

For example, for the 125$^{th}$ item generated from the item template, the generated item has references to "PICTURE" changed to "PICTURE__125" as shown below:

```
<GeneratedItem name="Picture" >
    <Text DataPath="pictureTitle"/>
    <Image id="PICTURE__125" DataPath="pictureUrl" />
    <Event type="onfocus" action="showSelected" /> <!-perform
showSelected when item has focus -->
    <Event type="onblur" action="showUnselected" /> <!-perform
showUnselected when item has focus -->
    <Action name="showSelected" type="show"
target="PICTURE__125" /> <!-show the picture -->
    <Action name="showUnselected" type="hide"
target="PICTURE__125" /> <!-hide the picture -->
    <Event type="onclick" action="openPicture" />
</ GeneratedItem >
```

The "showSelected" action shows the image element having the title displayed in the text element (also in the template) when the item is focused. The "showUnselected" hides the image when the item loses focus. The action named "openPicture" is defined elsewhere in the document and opens the currently selected picture for viewing. In practice this allows a user to visibly select and unselect pictures to view by navigating them with the arrow buttons and selecting them with an enter button. In the above example, this is accomplished without custom code in the web application and without requiring the server to render the items for display.

Templates themselves may also contain replaceable fields. A template, for example, may enable extra text to be shown for an item on which a user focuses. Thus, when the user focuses on the item it may pop up a brief description of the program. This may be accomplished by using a replaceable field replaceable with a textual description when the item has focus.

Example Process for Communicating Blocks of Data for Use in a Template

Figure 4:
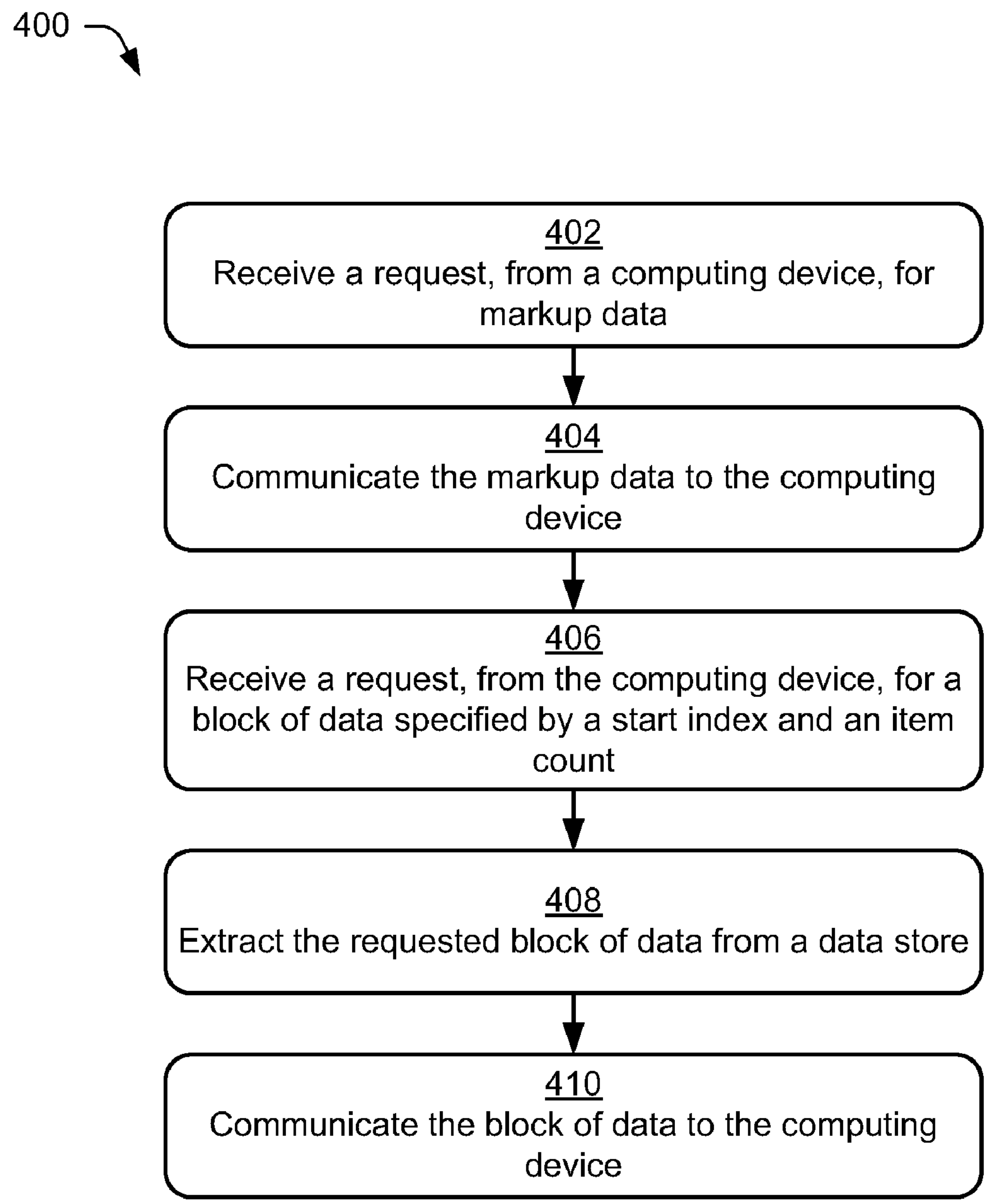
FIG. 4 is a flow diagram depicting an example process, including communicating blocks of data for use in a template.

FIG. 4 depicts a process 400 in which the tools communicate markup data and blocks of data for use with templates included in the markup data. An example user interface and system layout is described as part of this example process, though other user interfaces and system layouts are also contemplated.

Block 402 receives a request, from a computing device, for markup data. Block 404 communicates the markup data to the computing device. Continuing the example of FIGS. 1 and 3, computing device 112 receives a request from template-data-display module 110 for markup data 122. Computing device 112 then communicates markup data 122 to module 110.

Block 406 receives a request, from the computing device, for a block of data. The block of data is specified by a start index and item count as described above. Block 408 extracts the requested block of data from a data store. Block 410 communicates the block of data to the computing device. Continuing the example above, data-transmission module 118 receives a request for a block of data from data-block-retrieval module 108. This request takes the form of the URI described above and module 118 uses the startIndex and itemCount to extract the elements requested from data 120. Module 118 then communicates the requested elements from data 120 to module 108.

While blocks 402-410 are depicted as being performed by the same computing device, different computing devices may perform blocks 402 and 404 and blocks 406-410.

Conclusion

This document describes tools that enable a computing device to retrieve large sets of data in smaller blocks. The tools also allow a computing device to receive and display data that does not include display formatting information through the use of templates. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

retrieving markup data including a control definition, the control definition having one or more templates, each of the templates indicating a different way in which to display an element of data;

retrieving data separate from the markup data, the retrieved data having the element of data;

matching the element of data with one of the templates;

populating the matched template with the element of data to provide a populated template, the populated template ready for rendering as part of a control, the control created based on the control definition of the markup data;

retrieving multiple additional elements of data;

matching each of the multiple additional elements of data with additional templates of the one or more templates;

populating each of the matched additional templates with each of the multiple additional elements of data to provide additional populated templates, the additional populated templates ready for rendering as part of the control, the retrieved data and the retrieved multiple additional elements of data comprising a block of data;

navigating through the additional populated templates within the control until a pre-retrieve threshold is reached, the pre-retrieve threshold defined within the control definition and specifying a number of populated templates remaining to an end of the additional populated templates;

responsive to reaching the pre-retrieve threshold, requesting a next block of data and deleting at least a portion of the block of data; and the data and the multiple additional elements of data retrieved using a Uniform Resource Identifier (URI) included in the markup data, the URI having a plurality of fields.

2. The method as recited in claim 1, wherein the act of retrieving the data and the act of retrieving the multiple additional elements of data retrieve the block of data from a source of data, the block of data including fewer elements of data than a whole set of data at the source of data, wherein the plurality of fields of the URI includes a start index field that is populated with a value provided by the control definition that specifies an index of a first element of the block of data, and an item count field populated with a value provided by the control definition that specifies a number of elements of data in the block of data.

3. The method as recited in claim 2, wherein requesting the next block of data further comprises requesting the next block of data from the source of data by specifying a different start index and the item count.

4. The method as recited in claim 1, wherein one of the one or more templates includes an event definition, the event definition having an action field set to a pre-defined action or set to an action defined within the one of the one or more templates that includes the event definition.

5. The method as recited in claim 4, wherein the pre-defined action or the defined action is configured to show or hide an image that is represented by an image identifier, the image identifier being modified to include an index of an item generated from the template.

6. The method as recited in claim 1, wherein matching the element of data with one of the templates comprises comparing a template identifier within the element of data to identifiers of the one or more templates provided in the markup data and choosing one of the one or more templates that matches the identifier.

7. The method as recited in claim 1, wherein the markup data is located on a remote computing device prior to retrieval.

8. The method as recited in claim 1, wherein the data and the markup data are located on the same computing device prior to their respective retrievals.

9. The method as recited in claim 1, wherein the control is a list control or a menu control.

10. A method comprising:

retrieving, using a first Uniform Resource Identifier (URI) included in markup data and from a source of data having a whole set of data, a first block of data having a first number of data elements, the first number of data elements being fewer than those stored in the whole set of data, the first URI having a first start index field that specifies a first index of a first data element of the block of data and a first item count field that specifies the first number of data elements;

navigating through a control having data elements of the first block of data until a pre-retrieve threshold is reached, the pre-retrieve threshold specifying a remaining number of the data elements to an end of the first block of data that have not been navigated through; and responsive to reaching the pre-retrieve threshold, retrieving, using a second Uniform Resource Identifier (URI) included in the markup data and from the source of data, a second block of data having a second number of data elements and deleting at least a portion of the first block of data, the second number of data elements being fewer than those stored in the whole set of data, the second URI having a second start index field that specifies a second index of a different first data element of the second block of data and a second item count field that specifies the second number of data elements requested, the second start index being different than the first start index, the first number of data elements requested in the first item count field different than the second number of data elements requested in the second item count field, the data elements of the first block of data including markup data for displaying the data elements of the first block of data, and the retrieving the data elements of the first block of data separate from retrieving the markup data.

11. The method as recited in claim 10, further comprising:

retrieving markup data including a control definition having one or more templates, each of the templates indicating different ways in which to display data elements;

matching one of the data elements of the first block of data with one of the templates; and populating the matched template with its matched element of data to provide a populated template ready for rendering as part of a control, the control created based on the control definition of the markup data.

12. The method as recited in claim 10, wherein the source of data is located on a remote computing device.

13. A method comprising:

receiving a request from a computing device for markup data including a control definition having one or more templates, each of the templates indicating different ways in which to display data elements, and the markup data including a Uniform Resource Identifier (URI) that includes a start index field and an item count field;

communicating the markup data to the computing device, the markup data configured to cause the computing device to match at least one data element of a block of data with one of the templates and populate the matched template with its matched element of data to provide a populated template ready for rendering as part of a control that is created based on the control definition;

receiving a request from the computing device for the block of data, the request for the block of data specifying a start index identified in the start index field of the URI and an item count identified in the item count field of the URI of the block of data, the start index specifying an index of a first element of the block of data, the item count specifying a number of elements requested;

extracting the block of data from a data store;

communicating the block of data to the computing device separately from the markup data;

receiving an additional request from the computing device for a next block of data when a pre-retrieve threshold is reached, the pre-retrieve threshold specifying a remaining number of elements to an end of the block of data that have not been navigated through; and communicating the next block of data to the computing device effective to cause at least a portion of the block of data to be deleted by the computing device.

14. The method as recited in claim 13, wherein the URI is used to request the block of data and display formatting information usable by the computing device to display elements included in the block of data, the elements included in the block of data not including display formatting information.

15. A method comprising:

retrieving markup data including a control definition having one or more templates, each of the templates indicating different ways in which to display elements of data;

retrieving, from a source of data having a whole set of data, a first block of data having a first number of data elements, the first number of data elements being fewer than those stored in the whole set of data;

matching each element of the first number of elements with one of the templates;

populating each matched template with its matched element of data to provide populated templates, each of the populated templates ready for rendering as part of a control, the control created based on the control definition of the markup data;

navigating through the populated templates until a pre-retrieve threshold is reached, the pre-retrieve threshold defined within the control definition and specifying a number of populated templates remaining to an end that have not been navigated through; and responsive to reaching the pre-retrieve threshold, retrieving, from the source of data having the whole set of data, a second block of data having a second number of data elements and deleting at least a portion of the first block of data, the second number of data elements being fewer than those stored in the whole set of data, the first block of data retrieved using a first Uniform Resource Identifier (URI) included in the markup data, the first URI having a plurality of fields and the second block of data retrieved using a second URI included in the markup data, the second URI having a plurality of fields.

16. The method as recited in claim 15, wherein the plurality of fields of the first URI includes a first start index field that specifies a first index of a first data element of the first block of data and a first item count field that specifies the first number of data elements, and wherein the plurality of fields of the second URI includes a second start index field that specifies a second index of a different first data element of the second block of data and a second item count field that specifies the second number of data elements.

* * * * *